United States Patent
Meron et al.

(10) Patent No.: US 10,866,995 B2
(45) Date of Patent: Dec. 15, 2020

(54) RAPID ONLINE CLUSTERING

(71) Applicant: PayPal, Inc., San Jose, CA (US)

(72) Inventors: Avishay Meron, Gush-Dan (IL); Xing Wang, Shanghai (CN); Adam Cohen, Ramat Gan (IL); Chunmao Ran, Shanghai (CN); David Stein, Even Yehuda (IL)

(73) Assignee: PayPal, Inc., San Jose, CA (US)

( * ) Notice: Subject to any disclaimer, the term of this patent is extended or adjusted under 35 U.S.C. 154(b) by 609 days.

(21) Appl. No.: 15/689,916

(22) Filed: Aug. 29, 2017

(65) Prior Publication Data

US 2019/0065596 A1    Feb. 28, 2019

(51) Int. Cl.
| | | |
|---|---|---|
| G06F 16/00 | (2019.01) | |
| G06F 16/951 | (2019.01) | |
| G06N 5/04 | (2006.01) | |
| G06Q 20/10 | (2012.01) | |
| G06N 20/00 | (2019.01) | |
| G06F 16/28 | (2019.01) | |
| G06Q 20/40 | (2012.01) | |
| G06Q 20/32 | (2012.01) | |
| G06F 16/906 | (2019.01) | |

(52) U.S. Cl.
CPC .......... G06F 16/951 (2019.01); G06F 16/285 (2019.01); G06F 16/906 (2019.01); G06N 5/04 (2013.01); G06N 20/00 (2019.01); G06Q 20/10 (2013.01); G06Q 20/322 (2013.01); G06Q 20/4016 (2013.01)

(58) Field of Classification Search
CPC ..................................................... G06F 16/00
See application file for complete search history.

(56) References Cited

U.S. PATENT DOCUMENTS

| | | | |
|---|---|---|---|
| 7,945,668 B1 | 5/2011 | Nucci et al. | |
| 9,729,727 B1 * | 8/2017 | Zhang | H04M 15/47 |
| 10,311,499 B1 * | 6/2019 | Kim | G06Q 30/0631 |
| 2010/0257006 A1 * | 10/2010 | Quadracci | G06Q 30/02 705/7.33 |
| 2011/0106772 A1 | 5/2011 | Kawamura et al. | |
| 2011/0264612 A1 * | 10/2011 | Ryman-Tubb | G06Q 20/4016 706/12 |
| 2019/0034517 A1 * | 1/2019 | Byrd | G06F 17/40 |

FOREIGN PATENT DOCUMENTS

WO    WO 2008/092147    7/2008

* cited by examiner

*Primary Examiner* — Khanh B Pham
(74) *Attorney, Agent, or Firm* — Haynes and Boone, LLP

(57) ABSTRACT

Placing an event into a particular cluster can allow various inferences about the event. A new payment transaction that looks similar to a previously identified cluster of mostly fraudulent payment transactions, for example, may be higher risk. The present disclosure includes structural data improvements to the way that online clustering of events (which may include web events and not just payment transactions) occurs. A new event can be classified into a particular segment very quickly using feature table searching, which can allow for better decision making when a short timeframe is required (e.g. transaction processing, online advertising, etc.).

19 Claims, 5 Drawing Sheets

| Event ID | Account ID | Country | IP Address | Transaction Amt | Timestamp | Cluster Label |
|---|---|---|---|---|---|---|
| 798744654 | 1234 | US | 173.0.88.2 | $5.48 | 20170428134751 | 1 |
| 345235896 | 5678 | CN | 172.217.11.228 | $89.98 | 20170301002133 | 2 |
| 563454210 | 7890 | IT | 128.42.206.11 | $2.00 | 20161225200205 | 1 |
| 98234771 | 5678 | CN | 104.20.84.19 | $323.42 | 20170301000917 | 2 |

Records 200

Sample Event Log 400

| Event ID | F1 | F2 | F3 | F4 | F5 | Cluster Label |
|---|---|---|---|---|---|---|
| 1 | a | 1 | A | + | z | 1 |
| 2 | a | 1 | B | + | z | 1 |
| 3 | b | 2 | A | + | x | 1 |
| 4 | c | 3 | C | - | k | 2 |
| 5 | g | 3 | C | - | k | 2 |
| 6 | b | 2 | C | - | k | 2 |
| 7 | c | 3 | D | - | k | 2 |
| 402 | 404 | 406 | 408 | 410 | 412 | 414 |

FIG. 4B

Sample Lookup Table (F1 + F2 key) 450

| Key | Value |
|---|---|
| (a, 1) | [1, A, +, z] |
| (b, 2) | [ [1, A, +, x], [2, C, -, k] ] |
| (c, 3) | [2, C, -, k] |
| (g, 3) | [2, C, -, k] |
| 452 | 454 |

Sample Lookup Table (F4 + F5 key) 480

| Key | Value |
|---|---|
| (+, z) | [1, a, 1, A] |
| (+, x) | [1, b, 2, A] |
| (-, k) | [2, c, 3, C] |
| 482 | 484 |

RAPID ONLINE CLUSTERING

TECHNICAL FIELD

This disclosure includes techniques relating to rapid online clustering. In various embodiments, a computer can efficiently and quickly characterize an event, user action, and/or data. This allows for new and improved uses of clustering where speed or size requirements, for example, might not have permitted other clustering techniques to be used.

BACKGROUND

Classification of data may require that a given piece of data (e.g., all or part of a particular record) be categorized into one of a number of categories. This process can be performed manually by a user who examines the data, for example. In other instances, specific rules might be used to help automate the classification process.

Machine learning offers another alternative, where data can be categorized based on a machine learning model. However, some machine learning approaches to categorization may suffer from an inability to accurately categorize data within a particular time constraint. In certain data sets, particularly relating to large numbers of users of a system and/or service, it therefore may be difficult to quickly categorize certain data. Inability to categorize data correctly and/or in a timely manner can impact system performance and cause inefficiencies resulting in sub-optimal system operation.

BRIEF DESCRIPTION OF THE DRAWINGS

FIG. 2 illustrates a block diagram of a set of data records, according to some embodiments.

FIGS. 4A and 4B are block diagrams relating to sample event logs and reduced feature lookup tables, which can be used to perform a faster cluster classification, according to some embodiments.

DETAILED DESCRIPTION

Figure 1:
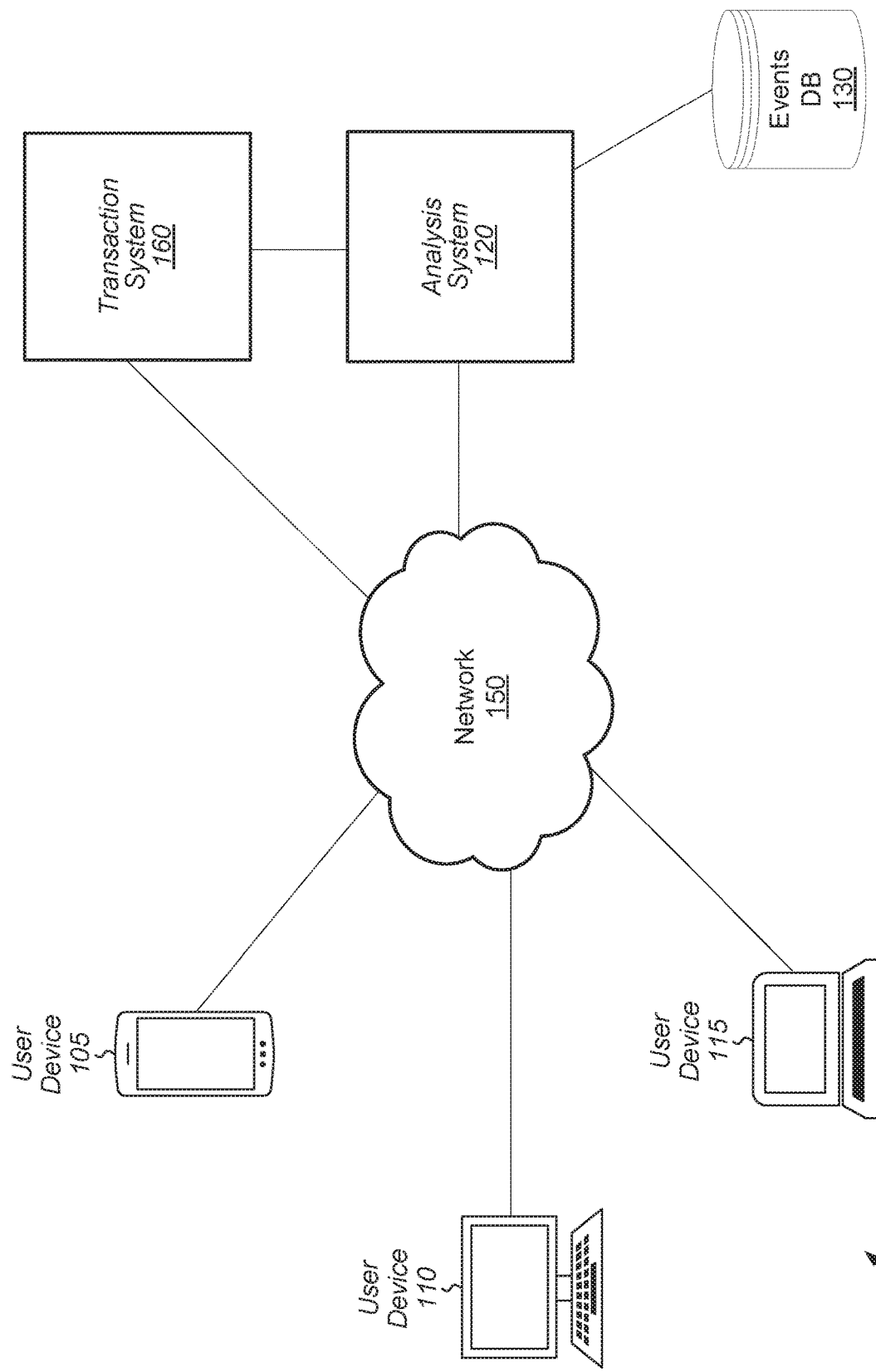
FIG. 1 illustrates a block diagram of a system that includes users devices, an analysis system, a transaction system, a network, and an events database according to some embodiments.

The present specification allows for the rapid online classification of items, such as user transactions, web page navigation events, etc. analysis of data and for improved data classification using advanced machine learning techniques. In particular, because fast classification is possible, previously unattainable classification can be performed within short time constraints as might be required by a service level agreement (SLA).

One concept in this disclosure is performing offline data processing that allows a faster online lookup in response to an event. Clusters of data items (e.g. events such as electronic payment transactions) can first be calculated using existing historical data. This data may be fully matured, and include results information related to an outcome of the event. For electronic payment transactions, the results information can include whether the transaction was successful, or whether the transaction was NSF (insufficient funds) or reported as fraud. For website navigation events, the results information related to an outcome of the navigation event could include information on which page(s) the user navigated to next, whether the user made a purchase of a good or service (and any number of related purchase details, such as price, type of item, method of payment, shipping address, etc.). Thus, pre-existing events can be clustered along with information indicative of results of the events. Note that in various systems, there may be millions or even billions of such prior events, and also a potentially large amount of unique event clusters.

When a new event is received (e.g. a new electronic payment transaction, or a new website navigation event such as a user opening a particular page in a web browser), there may be a short window of time in which to classify the new event into a particular cluster. A new payment transaction may have to be approved or denied in less than a second, for example, or dynamic content for a web page may have to be generated in tenths of a second or less (such content including advertising and/or other customized content for the web site).

By performing pre-processing on existing event data, reduced feature lookup tables can be constructed that allow extremely rapid classification of new events. This innovation in data science allows for new applications of clustering that were difficult or impossible to achieve previously, and allow for better decision making by a computing system.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Turning to FIG. 1, a block diagram of a system 100 is shown. In this diagram, system 100 includes user devices 105, 110, 115, an analysis system 120, a transaction system 160, and a network 150. Also depicted is events DB (database) 130. Note that other permutations of this figure are contemplated (as with all figures). While certain connections are shown (e.g. data link connections) between different components, in various embodiments, additional connections and/or components may exist that are not depicted. Further, components may be combined with one other and/or separated into one or more systems.

User devices 105, 110, and 115 may be any type of computing system. Thus, these devices can be a smartphone, laptop computer, desktop computer, tablet computer, etc. As discussed below, user devices such as 105, 110, and 115 may engage in various actions, including transactions, using transaction system 160. Analysis system 120 may comprise one or more computing devices each having a processor and a memory, as may transaction system 160. Network 150 may comprise all or a portion of the Internet.

In various embodiments, analysis system 120 can take operations related to constructed reduced feature tables for event information, as well as determining whether to assign a cluster identity to a new event. Note that different aspects of operations described relative to analysis system 120 (as well as other systems described herein) can be performed by two or more different computer systems in some embodiments. Analysis system 120 may be controlled by an entity who provides an electronically provided service, which may be an electronic transaction payment service in some instances (allowing for transfer of currency or other items).

Transaction system 160 may correspond to an electronic payment service such as that provided by PayPal™. Thus, transaction system 160 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds (credit, checking, balance, etc.). User devices 105, 110, and 115 can be used to access electronic payment accounts such as those provided by PayPal™.

Events database (DB) 130 includes records of various actions taken by users of transaction system 160. These records can include any number of details, such as any information related to a transaction or to an action taken by a user on a web page or an application installed on a computing device (e.g., the PayPal app on a smartphone). Many or all of the records in events database 130 are transaction records including details of a user sending or receiving currency (or some other quantity, such as credit card award points, cryptocurrency, etc.).

Turning to FIG. 2, a block diagram is shown of one embodiment of records 200. These records may be contained in events database 130, for example. In this example, the records shown belong to two different clusters 1 and 2.

As shown, field 202 includes an event ID. This may be a globally unique event identifier within an enterprise associated with transaction system 160. Thus, in one embodiment, the event ID in field 202 includes a unique ID for each of millions of electronic payment transactions processed by a service provider such as PayPal™.

Field 204 includes a unique account ID for a user. Field 206 includes a country code for the user (e.g., US=United States, CA=Canada, etc.).

Fields 208 and 210 represent an IP address date and a transaction amount (which may be specified in a particular currency such as US Dollars, Great Britain Pounds, etc.). The IP address might be the IP address of the user at the time the transaction was conducted, for example. Field 212 includes a transaction timestamp. In the examples shown, the timestamps are in the format (year) (two-digit month) (two-digit day) (hour) (minute) (seconds), but may be in any other format in various embodiments.

Field 214 indicates a cluster label. In this example, rows 1 and 3 belong to a first cluster 1, while rows 2 and 4 belong to a second cluster 2. Transactions may be clustered together based on those transactions having one or more similar characteristics. For example, the transactions may be from a same account, from a same IP address, from a same country, be associated with the same financial institution (e.g. credit card company or bank), etc. Many different possible clustering algorithms may be used to group transactions into a variety of clusters, as will be appreciated by one with skill in the art.

Many additional pieces of information may be present in events database 130 in various embodiments. An email address associated with an account (e.g. which can be used by users to direct an electronic payment to an account using only that account's associated email address) can be listed. Home address, phone number, and any number of other personal details can be listed. Further, note that the events shown in the embodiment of FIG. 2 explicitly relate to transactions that may be performed by an electronic payment system. In various embodiments, however, databases may include event information on other actions beyond payment transaction, such as actions taken relative to a website, or relative to an application installed on a device such as the PayPal application on a smartphone. Database information can therefore include location of where a user has logged into (authenticated) an account; unsuccessful login attempts (including IP address etc.); time of day and/or date of week for any event mentioned herein; funding sources added or removed and accompanying details (e.g. adding a bank account to allow currency to be added to or withdrawn from a user account), address or other account information changes, etc.

For purposes of assessing transaction risk (e.g. chances of fraud, chances of an insufficient funds for an ACH transfer, etc.), being able to assess what cluster a transaction falls into can be useful in various scenarios. For example, a particular cluster may comprise 100 different ACH transactions, 95 of which failed for insufficient funds. If a new ACH transaction occurs and it looks very similar the existing cluster of 100 ACH transactions, it can be inferred that the new ACH transaction has a high likelihood of failing.

One difficulty in performing clustering is that it may take too long for performing the clustering analysis. If an electronic payment transaction must be completed (e.g. accept or reject) within 300 milliseconds, for example, some clustering algorithms may be unable to find an appropriate cluster for the transaction within the allotted time. However, if a current transaction can be quickly assigned to an appropriate cluster, risk information for that cluster can be used to help more accurately determine if the transaction should be approved or declined (e.g., is this new transaction in a highly risky cluster, or a cluster that looks relatively low risk)?

Figure 3:
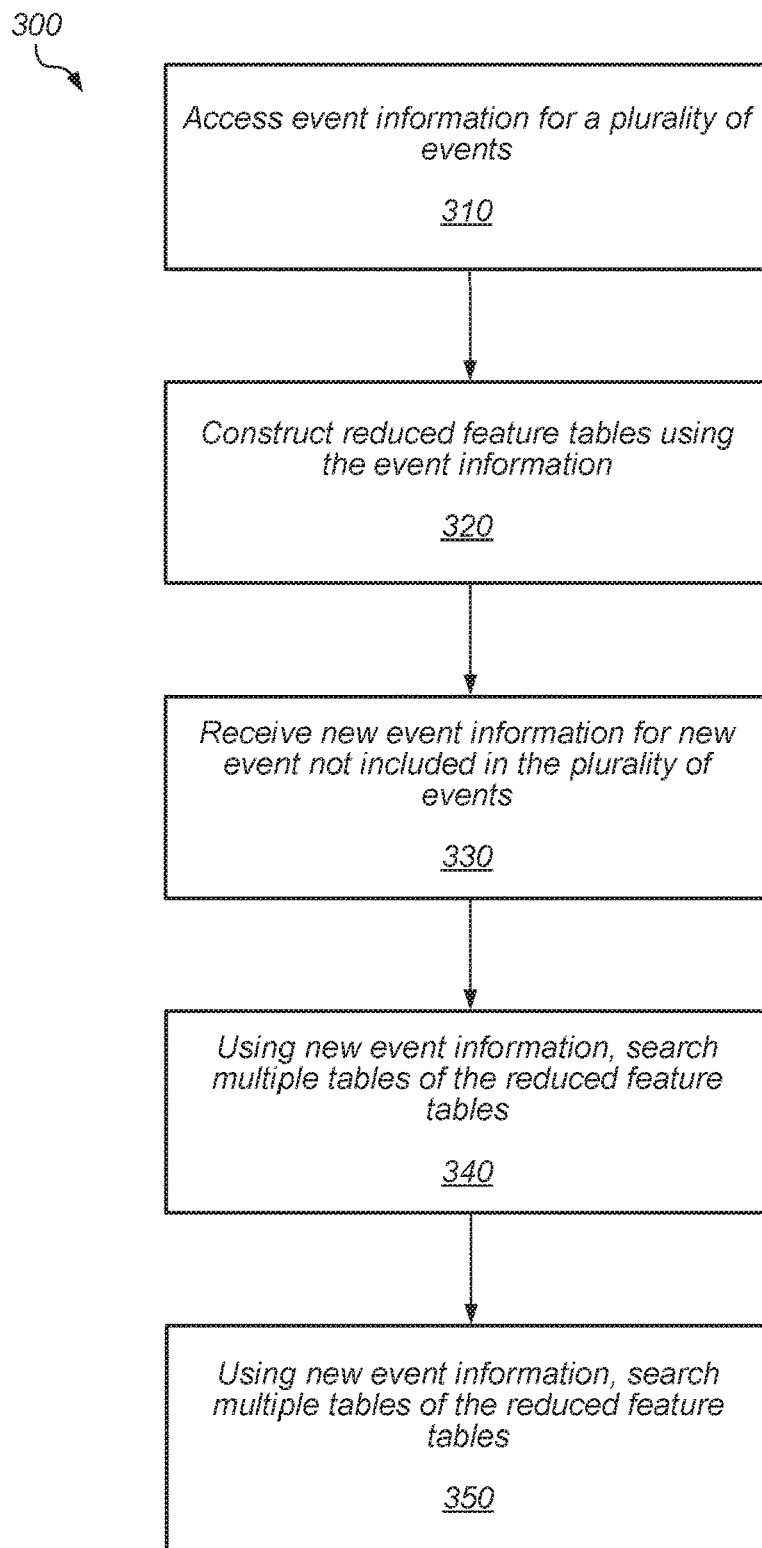
FIG. 3 illustrates a flow diagram is shown of a method that relates to classifying items (such as events) into clusters according to some embodiments.

Turning now to FIG. 3, a flow diagram is shown illustrating one embodiment of a method 300 that relates to classifying items (such as events) into clusters.

Operations described relative to FIG. 3 may be performed, in various embodiments, by any suitable computer system and/or combination of computer systems, including analysis system 120 and/or transaction system 160. For convenience and ease of explanation, however, operations described below will simply be discussed relative to analysis system 120. Further, various elements of operations discussed below may be modified, omitted, and/or used in a different manner or different order than that indicated. Thus, in some embodiments, analysis system 120 may perform one or more aspects described below, while transaction system 160 (or another system) might perform one or more other aspects.

In operation 310, analysis system 120 accesses event information for a plurality of events that occurred with respect to an electronically provided service, in one embodiment. This accessing can include reading data from events database 130, for example, that has information on a number of prior electronic payment transactions such as may be facilitated by a service provider like PayPal. In other instances, the event information may not be regarding making or receiving payments, but could relate to other user actions—such as navigation within a web browser (sites and pages visited, order of visitation, length of time on a particular page, number of times a site has been visited within a particular time period such as a day, week, month, year, etc.).

In the embodiment shown for operation 310, information for each of a plurality of events includes data values for a set of features indicative of aspects of the events. Each feature in the set may be indicative of a variety of different pieces of information related to an event (or another item that can be classified into a cluster).

Referring back to FIG. 2, records 200 illustrate a variety of features for an event. Features shown include a country associated with the transaction, an IP address, transaction amount, etc. As noted above, there may be many other features beyond those shown. Other features may be descriptive of a hardware device of a user, for example (e.g., a value indicating whether it is a laptop, desktop, tablet, smartphone, or other type of device, a value for screen viewing size in pixels, type of processor (AMD™, INTEL™, etc.), MAC address, etc.).

Thus, a particular feature for a set of features may be "IP address." For a group of events having corresponding information in events database 130, each of the events may have a data value for this particular feature (different IP addresses). Each event record may have a value for each one of the set of features, in one embodiment, while in other embodiments some values may be missing or inferred (and assigned an inferred value).

Additionally, in the embodiment shown for operation 310, the event information indicates a respective particular cluster identity previously assigned to each of a plurality of events. In FIG. 2, for example, it can be seen that events are assigned to either Cluster 1 or Cluster 2. More generally, in the case of electronic payment transactions, each of a number of prior transactions can thus be grouped with one another such that there may be many different uniquely identified clusters of transactions. This clustering may be performed for items other than electronic payment transaction records in different embodiments. Events with a particular cluster identity will generally have a higher degree of similarity to one another (e.g. through their feature data values) than to other random events in a large plurality of events. As noted above, various known clustering techniques can be used to generate an initial set of clusters from past transactions.

In operation 320, in one embodiment, analysis system 120 constructs a plurality of reduced feature tables using the event information from operation 310. These reduced feature tables will allow for rapid online clustering of an event (or other item) as described below.

First, consider a scenario where event data has a reasonably large number of features, such as 100 different features. A database table for event data in this scenario might be 100 columns wide, with each feature having a value in each column. In most database tables, there is only one (or perhaps a few) index values that can be easily searched on. In the case of a large transaction system, such a database table could be millions of entries long for even one single day, and hundreds of millions of entries long for a longer period of time (e.g. one month).

When a new (e.g. previously unclassified) event occurs, such as a new transaction attempt from a user, it may be impossible to locate, within a short amount of time, an appropriate cluster for the new transaction with a database table organized as described above (100 columns wide, large number of entries). For example, for each of a number of clusters in the database, a complicated search and compare operation might have to be performed where the values for the new event are compared to all 100 of the existing values for previously classified events in each of the clusters. This process can be lengthy and inefficient. Further, even some optimization techniques may still render this approach unworkable within tight timeframes (such as a service level agreement (SLA) for approving or denying a transaction).

In operation 320 when reduced feature tables are constructed, however, information from a large complex table may be manipulated and placed into a number of smaller tables that can be searched more easily (and in parallel, in various embodiments, further speeding operations). In various embodiments, each of the constructed reduced feature tables is keyed on a respective unique particular combination of features from a larger set of features (e.g. the features used to describe the event data). Reduced feature tables are now discussed further below relative to FIGS. 4A and 4B.

In FIG. 4A, a block diagram illustrating one example of a sample event log 400 is shown. In this sample event log, field 402 includes a unique event ID, while field 414 includes a cluster to which each of the records (and therefore each unique event) is assigned. In other words, in the example of FIG. 4A, a clustering algorithm has already been run on sample event log 400, and the clustering algorithm has assigned records into one of two different clusters.

From this sample event log 400, various reduced feature tables can be constructed. These reduced feature tables are created, in this example, using information from fields 404, 406, 408, 410, 412, and 414.

While reduced feature tables generally are keyed on a respective unique combination of features in various embodiments, in this example, the reduced feature tables are uniquely keyed on respective pairs of features from a set of features. (As opposed to being keyed on a combination of 3 or more features, for example). Note, of course, that having any tuple size for the key is possible in various embodiments—for example, three, four, or any number can be used (there can be a tradeoff, however, in covering an entire event log with uniform amounts of clusters for each key while reducing the amount of key value pairs.)

Two reduced feature tables 450 and 480 are shown in FIG. 4B. Reduced feature table 450 is keyed, in field 452, using all possible combinations of features F1 and F2 (fields 404 and 406) that exist in sample event log 400. From examining event log 400, it can be seen that event IDs 1 and 2 have values of (a, 1) for features F1 and F2, while event IDs 3 and 6 have values of (b, 2) for features F1 and F2. Meanwhile, event IDs 4 and 7 have values of (c, 3) for features F1 and F2, while event ID 5 has a value of (g,3). Thus, this set of four value tuples (value pairs, in this case) are used as the key values for reduced feature table 450. Note that in this example, each of the key values pairs used in table 450 are value pairs that appear at least once within a particular record (for a particular event) in event log 400.

The values in field 454 for reduced feature table 450 is made of tuples constructed from values that appear for other remaining features in event log 400 (F3, F4, and F5). These values may be constructed in a variety of ways, but in the embodiment shown, the values are constructed using the same methodology for each key value pair (e.g., each row of table 450).

This tuple value construction methodology includes examining each feature not included in the key value—in this case for table 450, features F3, F4, and F5. A list of one or more tuples is constructed for each keypair value in field 452, with each tuple corresponding to a particular cluster that appears.

In the case of row 1 for key value pair (a, 1), there are two records in event log 400—event IDs 1 and 2. Each of these event IDs correspond to only cluster 1, so only one tuple is created for reduced feature table 450 on row 1. The first value of the created tuple (field 454, row 1) is "1" for cluster 1 (and in this example, the first value of every created tuple in field 454 will be a cluster identity). The second, third, and fourth values for the tuple are the most commonly occurring values for features F3, F4, and F5 in event log 400—but only for those events having (a, 1) for features F1 and F2. Accordingly, the second, third, and fourth values are "A", "+", and "z". Note that in determining the value of "A", there is exactly one instance of "A" (on row 1, field 408 for feature F3) and exactly one instance of "B" (on row 2, field 408 for feature F3). In this case, a tiebreaking procedure can be used, such as always picking a first appearing value, or making a random selection.

Moving on to row 2 of reduced feature table 450, the key value pair in field 452 is (b, 2) corresponding to event IDs 3 and 6 from sample event log 400. In this case, event ID 3 is assigned to cluster 1, while event ID 6 is assigned to cluster 2. Because there are two different cluster identities appearing for records having (b, 2) as their values for F1 and F2 in sample event log 400, two different tuples are created in row 2, field 454. These tuples begin with cluster identity (1 and 2), then follow with the most commonly occurring values for the other features F3, F4, F5. In this case, this calculation is trivial, since there is only one record for each of cluster 1 and cluster 2. Thus, the first tuple in row 2, field 454 gets the values from event ID 3, while the second tuple in row 2, field 454 gets the values from event ID 6. Rows 3 and 4 in reduced feature table 450 are calculated similarly.

Additional reduced feature tables are calculated for sample event log 400 in the example shown. In this case, the following reduced feature tables would be calculated in total, based on feature key value pairs:

| Key: | Values: | |
| --- | --- | --- |
| F1, F2 | F3, F4, F5 | [table 450] |
| F1, F3 | F2, F4, F5 | |
| F1, F4 | F2, F3, F5 | |
| F1, F5 | F2, F3, F4 | |
| F2, F3 | F1, F4, F5 | |
| F2, F4 | F1, F3, F5 | |
| F2, F5 | F1, F3, F4 | |
| F3, F4 | F1, F2, F5 | |
| F3, F5 | F1, F2, F4 | |
| F4, F5 | F1, F2, F3 | [table 480] |

Most of these tables are not specifically illustrated, but can be calculated in a similar fashion to that described above. Note that the "Values" shown above, in various embodiments, always include a cluster identity as part of the value tuple (along with the most frequent values of other features), although the cluster identity value is omitted in the above example for simplicity. As indicated elsewhere, there may be a feature value tuple present for each cluster indicated by a given key value tuple (e.g. there may be multiple feature value tuples present with each one corresponding to a different cluster in different embodiments).

Sample lookup table 480 is keyed on all combinations of features F1 and F2 as they appear in individual records from sample event log 400, in the embodiment shown. Thus, field 482 includes key value pairs (+, z) for event IDs 1 and 2, (+, x) for event ID 3, and (−, k) for event IDs 4, 5, 6, and 7. As can be seen in FIG. 4B, values for sample lookup table 480 are present in field 484, with the values being tuples containing the most commonly occurring values for features F1, F2, and F3, along with the cluster for those values. In this example, there are no key value pairs for F4 and F5 that are split across different cluster identities—and thus, there is only one tuple value for field 484 (unlike field 454, which had two tuples in row 2).

Referring again to operation 320 from FIG. 3, reduced feature tables can thus be constructed in a fashion similar to that shown by the event information of FIG. 4A and the sample lookup tables of FIG. 4B.

In operation 330, new event information is received by analysis system 120. This new event information is not included in a plurality of earlier-occurring events in various embodiments (e.g. as indicated in the event information from operation 310). The new event also may have new data values for a set of features related to the earlier-occurring events.

As indicated above, a first set of events may occur (e.g. electronic payment transactions) for which a result of the event is known—for example, a transaction is approved, denied, or approved but later determined to be fraudulent, or have insufficient funds (NSF) (as in the case of an ACH transfer). This first set of events can be broken down into a variety of clusters, each of which may be more or less risky as a group (e.g. a cluster might include a high proportion of known fraudulent transactions, or another cluster might be extremely low risk—perhaps only 0.05% of transactions for that cluster were fraudulent or NSF).

When a new event occurs in operation 330—such as a new electronic payment transaction—it may be useful to quickly determine what pre-existing cluster that new event should fall into. If the new event is clustered into a pre-existing high risk cluster, for example, the overall transaction can have a risk score adjusted such that transaction system 160 is more likely to reject the transaction.

Thus, in one embodiment, operation 330 includes receiving information indicating that a user is trying to conduct an electronic payment transaction via transaction system 160. A user might be trying to send money to another user (peer to peer transaction, purchase from a merchant, etc.), for example. Such a transaction may have a very short time limit in which it must be approved or denied-300 or 500 milliseconds, for example. Thus, for purposes of assessing risk, the new transaction would need to be classified into a particular transaction cluster within less than that time period in order for the cluster identity to be able to have an effect on the approval of the transaction, in some embodiments. If clustering for the new transaction took seconds or minutes, however, the end user might be waiting for an approval or denial for an unacceptably long amount of time (a user who has to wait 2 minutes for a payment transaction to be approved is likely to get frustrated and cancel the transaction, or to simply use an alternative form of payment that is not as slow). In other embodiments, operation 330 is indicative of an event other than an electronic payment transaction—for example, the new event might be a user navigating to a particular web page (which might trigger classifying that event into a particular cluster, which could then be used to serve dynamic content to the user, such as advertising or particular customized content relating to functionality of the website). Note, that in some embodiments, this dynamic content might be used in the context of browsing merchant web pages. Once a user has shown interest in a book, for example, by visiting its page on a particular web site, there might be a list of products that "Others that visited this specific page, were also interested in". By using rapid online cluster prediction, the "other items" shown to the user could be created using the cluster assigned to a user and/or her browsing session (as opposed to a more naïve approach that did not rely on cluster assignment, for example, without looking at deeper context for the user).

In other words, operation 330 can include receiving new event information for an event of the same type of events that have been previously categorized into a number of different clusters (and both the new event and the older categorized events may all have information relating to a same set of features, such as transaction amount, IP address, etc.).

In operation 340, analysis system 120 searches multiple tables of the reduced feature tables generated in operation 320, in various embodiments, using new event information received in operation 330.

In various embodiments, the searching performed in operation 340 can be performed rapidly and/or in parallel on multiple reduced feature tables. Because the reduced feature tables are keyed on various simplified feature combinations (e.g. F1+F2, F1+F3, etc., in the example of FIGS. 4A and 4B), these searches can be performed quickly and efficiently.

One aspect of operation 340 works as follows. Consider a new event (such as an electronic payment transaction, viewing of a website, and/or other) having particular features in a set of features. In order to classify the event into a particular cluster, a number of rapid searches can be performed on a variety of reduced feature lookup tables. For example (referring to FIGS. 4A and 4B), a new event may have a particular feature combination for F1 and F2. Using these key values, table 450 can be rapidly searched to determine if that key value pair is already present within that table. If the key value pair is present, then additional calculations can be performed relative to the other feature values (e.g. F3, F4, F5) in the set of features. More specifically, the other features values from the reduced feature lookup table can be compared to see if the new event has any matching feature values. In the case of the F1+F2 key value pair (b, 2), weighting can be given to the remaining F3, F4, and F5 feature values to determine if, based on the F1+F2 key value pair, whether the new event is more likely to be in cluster 1 or cluster 2 (or another cluster).

As an example, consider a new event having the features (b, 2, A, +, k). Table 450 could be searched based on the key value pair (b, 2). This search would result in row 2 of table 450, with field 454 as a result. Field 454 would then be searched using the residual values (A, +, k) for features F3, F4, and F5. Looking at the search result, the first tuple from table 450 (corresponding to cluster 1) has feature values (A, +, x) while the second tuple (corresponding to cluster 2) has feature values (C, −, k) for F3, F4, and F5.

In this scenario, the new event has 2 of 3 feature values (other than the key pair index values) that match for cluster 1—the values A and + for features F3 and F4. Meanwhile, the new event only matches one feature value (k) on feature F5. Based on majority weighting, the new even would be deemed as a match for cluster 1 in this scenario (in this embodiment). Accordingly, the first reduced feature table search on the F1 and F2 key value pair would indicate the cluster identity 1 for the new event. (Note that in the event of a tie, no cluster weighting might be assigned, or a tiebreaker procedure could be used, or one or more clusters might get a same weighting which could be summed later.) Further, in some embodiments, a threshold might be required for a search of a reduced feature table to give weight to a final cluster assignment result. Consider a reduced feature table with a large number of key values (e.g., 50 or 100 features). In such an embodiment, it might be desirable to require that a new event match at least 5 or 10 or some other number of values for the feature table search to indicate a match. (That is, if a new event has 100 features, but only two of those features match within the reduced feature table, this may be an insufficiently strong link to affect overall cluster classification results).

The search for the new event, relative to operation 340, would be repeated one or more times for other reduced feature tables. Simply searching one reduced feature table might not give a sufficiently good match, so multiple table could be searched until a confidence level is reached. For example, for a new event, all the feature tables listed above (F1+F2 key value pair, F1+F3 key value pair, etc.) can be searched, with a cluster weighting assigned to each intermediate search result. At the end of the process—or when a given cluster gets a sufficiently high weighted result—the new event can be assigned to a cluster as part of the online rapid clustering algorithm.

Thus, searching in operation 340 can include searching a number of different reduced feature tables that have been constructed all or part of the same underlying data (such as past electronic payment transactions, past website visitations, etc.). These tables can also be searched in parallel in some instances—where multiple tables are searched at once in order to speed up operations. Each table search may have a result, as indicated above. The results of searching multiple tables can be calculated together to determine which of a number of different clusters an event should be assigned to.

For example, consider searching first reduced feature tables T1, T2, . . . and T10 based on different key values (such as feature pair F1+F2, F1+F3, etc.) for a new unclassified event. Results from the search might appear as follows:

T1 result: Cluster 1
T2 result: nil
T3 result: Cluster 2
T4 result: Cluster 2
T5 result: Cluster 1
T6 result: Cluster 2
T7 result: nil
T8 result: Cluster 2
T9 result: Cluster 2
T10 result: Cluster 3

In this example, the new event would be classified as Cluster 2 (five matches) rather than Cluster 1 or Cluster 3. In another example, each search of a reduced feature table can produce weighted results depending on how many different elements matched within the table on the key values for the new event. For example:

|  | Cluster 1 | Cluster 2 | Cluster 3 |
|---|---|---|---|
| T1 result: | 2 | 0 | 0 |
| T2 result: | 0 | 1 | 0 |
| T3 result: | 0 | 3 | 1 |
| T4 result: | 2 | 3 | 2 |
| T5 result: | 4 | 4 | 0 |
| T6 result: | 0 | 4 | 1 |

-continued

|  | Cluster 1 | Cluster 2 | Cluster 3 |
|---|---|---|---|
| T7 result: | 0 | 0 | 0 |
| T8 result: | 1 | 3 | 1 |
| T9 result: | 0 | 2 | 0 |
| T10 result: | 1 | 0 | 3 |
| Totals | 10 | 20 | 8 |

In the preceding example, each search of a reduced feature table can increment multiple values for different clusters. This might affect classification results in certain circumstances (e.g., a new event might weakly match cluster 1 in 6 of 10 tables, but match cluster 2 extremely strongly in 4 of 10 tables—which could result in the new event being deemed as part of cluster 2 based on weighting). Also note that in the above example, different threshold weight levels can be used. A minimum threshold weight might be used to assign an event to a cluster (and if this weight is not met, the event is not assigned to a pre-existing cluster). Further, a "stop searching" threshold weight can also be used, where if the threshold is might during searching of the reduced feature tables (e.g., 12 of 20 tables have been searched and show a very strong match to cluster #3), then the search can be halted and the event can be assigned to the cluster indicated by the partial search results. (Or even if the search is not halted, subsequent results could be ignored).

In operation 350, analysis system 120 determines whether to assign a cluster identity to the new event based on results of searching in operation 340, in one embodiment. As discussed above, various techniques can be used to determine which cluster a new event has a relatively strong similarity with, and the new event can be assigned to that cluster (e.g. a record in events database 130 can be updated with a new cluster tag for the event). In some cases, if there is no good match for the new event, no cluster may be assigned. A new cluster can be generated in such cases, and the new event can be assigned to the new cluster as desired.

Computer-Readable Medium

Figure 5:
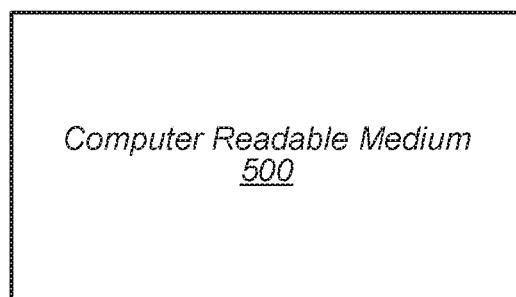
FIG. 5 is a diagram of a computer readable medium, according to some embodiments.

Turning to FIG. 5, a block diagram of one embodiment of a computer-readable medium 500 is shown. This computer-readable medium may store instructions corresponding to the operations of FIG. 3 and/or any techniques described herein. Thus, in one embodiment, instructions corresponding to analysis system 120 may be stored on computer-readable medium 500.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript. Note that as used herein, the term "computer-readable medium" refers to a non-transitory computer readable medium.

Computer System

Figure 6:
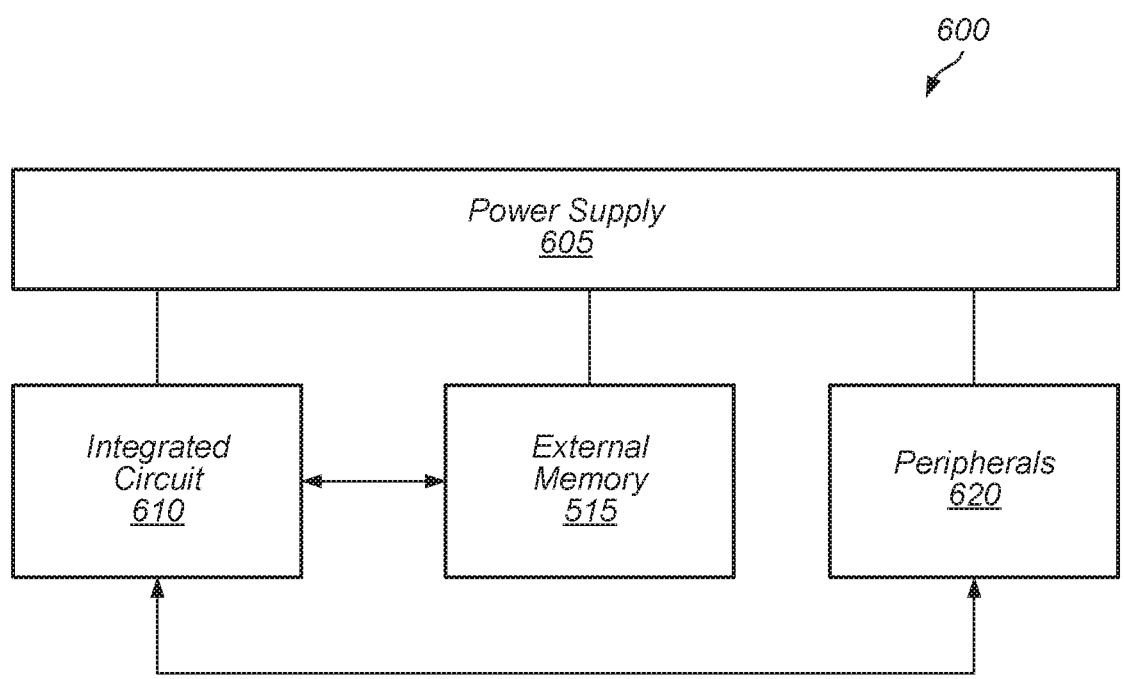
FIG. 6 is a block diagram of a system, according to some embodiments.

In FIG. 6, one embodiment of a computer system 600 is illustrated. Various embodiments of this system may be analysis system 120, transaction system 160, or any other computer system as discussed above and herein.

In the illustrated embodiment, system 600 includes at least one instance of an integrated circuit (processor) 610 coupled to an external memory 615. The external memory 615 may form a main memory subsystem in one embodiment. The integrated circuit 610 is coupled to one or more peripherals 620 and the external memory 615. A power supply 605 is also provided which supplies one or more supply voltages to the integrated circuit 610 as well as one or more supply voltages to the memory 615 and/or the peripherals 620. In some embodiments, more than one instance of the integrated circuit 610 may be included (and more than one external memory 615 may be included as well).

The memory 615 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 610 in a chip-on-chip configuration, a package-on-package configuration, or a multi-chip module configuration.

The peripherals 620 may include any desired circuitry, depending on the type of system 600. For example, in one embodiment, the system 600 may be a mobile device (e.g. personal digital assistant (PDA), smart phone, etc.) and the peripherals 620 may include devices for various types of wireless communication, such as wifi, Bluetooth, cellular, global positioning system, etc. Peripherals 620 may include one or more network access cards. The peripherals 620 may also include additional storage, including RAM storage, solid state storage, or disk storage. The peripherals 620 may include user interface devices such as a display screen, including touch display screens or multitouch display screens, keyboard or other input devices, microphones, speakers, etc. In other embodiments, the system 600 may be any type of computing system (e.g. desktop personal computer, server, laptop, workstation, net top etc.). Peripherals 620 may thus include any networking or communication devices necessary to interface two computer systems.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computer system, comprising:
  a processor; and
  one or more computer-readable media having stored thereon instructions that are executable to cause the computer system to perform operations comprising:
    accessing event information for a plurality of events that occurred with respect to an electronically provided service, wherein information for each of the plurality of events includes data values for a set of features indicative of aspects of the events, and wherein the event information indicates a respective first cluster identity previously assigned to each of the plurality of events;
    constructing a plurality of reduced feature tables using the event information, wherein each of the reduced feature tables is keyed on a respective unique particular combination of features from the set of features;
    receiving a new event information for a new event not included in the plurality of events, wherein the new event has new data values for the set of features;
    using the new data values, using searching multiple ones of the reduced feature tables with unique combinations of the new data values; and
    based on results of the searching, determining whether to assign a second cluster identity of one of a plurality of previously assigned clusters to the new event,
    wherein the constructing the plurality of reduced feature tables comprises:
      creating a first reduced feature table for a first feature and a second feature from the set of features, including:
        determining, from the event information, a set of one or more key values comprising each unique pair-wise combination of values for the first and second features indicated in individual records in the event information; and
        creating one or more tuples of one or more values, for each of the unique pair-wise combination of values for the first and second features, wherein a tuple is created for each unique cluster identity having a record in the event information for that pair-wise combination of values, and wherein the one or more tuples include feature values for features other than the first and second features.

2. The computer system of claim 1, wherein the reduced feature tables are each uniquely keyed on a respective pair of features from the set of features.

3. The computer system of claim 2, wherein each of the reduced feature tables includes one or more tuple elements for each feature pair key value, each of the tuple elements including a respective unique cluster identity and a plurality of feature data values corresponding to that unique cluster identity.

4. The computer system of claim 3, wherein for each of the tuple elements, each of the plurality of feature data values corresponding to a unique cluster identity is a most commonly occurring feature data value for that unique cluster identity in the plurality of events.

5. The computer system of claim 1, wherein the computer system is controlled by an entity who provides the electronically provided service, and wherein the electronically provided service is an electronic transaction payment service.

6. The computer system of claim 1, wherein the operations further comprise:
  based on the results of the searching indicating the new event has at least a threshold level of similarity to a particular cluster, assigning the new event to the particular cluster.

7. The computer system of claim 1, wherein the operations further comprise:
  based on the results of the searching indicating the new event does not have at least a threshold level of similarity to any of the plurality of previously assigned clusters, generating a new cluster and assigning the new event to the new cluster.

8. A method for rapid online clustering of a new event, comprising:
  receiving, by a computer system, new event information for a new event not included in a plurality of events that occurred with respect to an electronically provided service;
  accessing, by the computer system, a plurality of reduced feature tables, wherein each of the reduced feature tables is keyed on a respective unique particular combination of features from a set of features, wherein the reduced feature tables comprises a first reduced feature table that is generated for a first feature and a second feature from the set of features using event information for the plurality of events, wherein the event information for each of the plurality of events includes a set of one or more key values comprising each unique pair-wise combination of values for the first and second features indicated in individual records in the event information, and wherein the reduced feature tables further comprises one or more tuples of one or more values, for each of the unique pair-wise combination of values for the first and second features, wherein a tuple is created for each first cluster identity previously assigned to individual ones of the plurality of events that has a record in the event information for that pair-wise combination of values, and wherein the one or more tuples include feature values for features other than the first and second features;
  searching, using new data values that are in the set of features for the new event, multiple ones of the reduced feature tables; and
  based on results of the searching, assigning a second cluster identity to the new event.

9. The method of claim 8, wherein the second cluster identity assigned is for a cluster previously assigned to one or more of the plurality of events.

10. The method of claim 8, wherein the second cluster identity assigned is for a newly created cluster not previously assigned to one or more of the plurality of events.

11. The method of claim 8, further comprising approving an electronic payment transaction based on the second cluster identity.

12. The method of claim 8, further comprising rejecting an electronic payment transaction based on the second cluster identity.

13. The method of claim 8, wherein the event is a web navigation event.

14. The method of claim 13, further comprising causing an advertisement to be served to a user based on the second cluster identity.

15. The method of claim 13, further comprising customized content for a website to be presented to a user based on the second cluster identity.

16. A non-transitory computer-readable medium having stored thereon instructions that are executable by a computer system to cause the computer system to perform operations comprising:

receiving event information for a new event not included in a plurality of events that occurred with respect to an electronically provided service;

accessing a plurality of reduced feature tables, wherein each of the reduced feature tables is keyed on a respective unique particular combination of features from a set of features, wherein the reduced feature tables comprises a first reduced feature table that is generated for a first feature and a second feature from the set of features using event information for the plurality of events, wherein the event information for each of the plurality of events includes a set of one or more key values comprising each unique pair-wise combination of values for the first and second features indicated in individual records in the event information, and wherein the reduced feature tables further comprises one or more tuples of one or more values, for each of the unique pair-wise combination of values for the first and second features, wherein a tuple is created for each first cluster identity previously assigned to individual ones of the plurality of events that has a record in the event information for that pair-wise combination of values, and wherein the one or more tuples include feature values for features other than the first and second features;

searching, using new data values that are in the set of features for the new event, multiple ones of the reduced feature tables; and based on results of the searching, assigning a second cluster identity to the new event.

17. The non-transitory computer-readable medium of claim 16, further comprising approving or denying a request to pay currency electronically based on the second cluster identity.

18. The non-transitory computer-readable medium of claim 16, wherein the searching comprises searching the plurality of reduced feature tables in parallel.

19. The non-transitory computer-readable medium of claim 18, wherein the searching does not require that all of the plurality of reduced feature tables be searched if a threshold value is reached while searching using the new data values for the new event.

* * * * *